(12) United States Patent
Burgemeister et al.

(10) Patent No.: US 10,639,686 B2
(45) Date of Patent: May 5, 2020

(54) FLOW CABINET SYSTEM FOR CLEANING AT LEAST ONE OBJECT

(71) Applicant: Digital Metal AB, Höganäs (SE)

(72) Inventors: Magnus Burgemeister, Mölndal (SE); Bo-Göran Andersson, Viken (SE)

(73) Assignee: DIGITAL METAL AB, Höganäs (SE)

( * ) Notice: Subject to any disclaimer, the term of this patent is extended or adjusted under 35 U.S.C. 154(b) by 473 days.

(21) Appl. No.: 15/313,094

(22) PCT Filed: May 20, 2015

(86) PCT No.: PCT/EP2015/061083
§ 371 (c)(1),
(2) Date: Nov. 21, 2016

(87) PCT Pub. No.: WO2015/177195
PCT Pub. Date: Nov. 26, 2015

(65) Prior Publication Data
US 2017/0182528 A1    Jun. 29, 2017

(30) Foreign Application Priority Data
May 21, 2014    (GB) .................................... 1409112.8

(51) Int. Cl.
*B08B 15/02*    (2006.01)
*B22F 3/24*    (2006.01)
(Continued)

(52) U.S. Cl.
CPC ............ *B08B 15/026* (2013.01); *B08B 1/002* (2013.01); *B08B 5/02* (2013.01); *B22F 3/24* (2013.01);
(Continued)

(58) Field of Classification Search
CPC . B08B 15/026; B08B 1/002; B08B 2215/003; B08B 5/02; B22F 2003/247; B22F 3/24; B33Y 40/00
See application file for complete search history.

(56) References Cited

U.S. PATENT DOCUMENTS 3,199,171 A  *  8/1965  Hellmann et al. ........ B24C 3/00
                                                    29/90.01
3,300,902 A  *  1/1967  Dockery ................. B24C 9/006
                                                    209/137
(Continued)

FOREIGN PATENT DOCUMENTS

CN         201394546 Y     2/2010
EP         2492025 A1      8/2012
(Continued)

OTHER PUBLICATIONS

JP H0614858 Y2—English Machine Translation (Year: 1994).*
(Continued)

*Primary Examiner* — Marc Carlson
(74) *Attorney, Agent, or Firm* — Lowe Graham Jones PLLC

(57) ABSTRACT

The invention relates to a flow cabinet system for cleaning at least one object, the system comprising:
  a cabinet having walls enclosing a volume;
  tubing for the supply of compressed gas as well as a plurality of handheld cleaning tools within the volume for removing, by means of the supplied compressed gas, powder from the at least one object; and
  an extraction unit comprising tubing for extracting powder-laden gas from the volume through a gas outlet located near one of the left and right side walls and the back wall.
The cabinet further comprises a gas inlet in the back wall near the other of the left and right side walls and the back
(Continued)

wall so as to define an overall flow that is substantially horizontal and transverse to the operator.

15 Claims, 6 Drawing Sheets

(51) Int. Cl.
*B33Y 40/00* (2020.01)
*B08B 1/00* (2006.01)
*B08B 5/02* (2006.01)

(52) U.S. Cl.
CPC ......... *B33Y 40/00* (2014.12); *B08B 2215/003* (2013.01); *B22F 2003/247* (2013.01)

(56) References Cited

U.S. PATENT DOCUMENTS

| | | | |
|---|---|---|---|
| 3,599,375 A | 8/1971 | Nunemaker | |
| 3,624,967 A * | 12/1971 | Kamper et al. | B24C 3/065 451/2 |
| 3,811,250 A | 5/1974 | Fowler, Jr. | |
| 3,982,605 A * | 9/1976 | Sneckenberger | B05B 1/005 181/247 |
| 4,300,318 A * | 11/1981 | Brown | B24C 3/02 451/38 |
| 4,505,077 A * | 3/1985 | Sheesley | B24C 9/00 451/101 |
| 4,753,094 A * | 6/1988 | Spears | B05B 7/144 72/53 |
| 4,773,311 A | 9/1988 | Sharp | |
| 4,928,440 A * | 5/1990 | Hughes | B24C 9/00 451/456 |
| 5,177,911 A * | 1/1993 | Ruemelin | B24C 9/00 451/456 |
| 5,556,324 A * | 9/1996 | Shank, Jr. | B24C 9/00 451/87 |
| 5,971,839 A * | 10/1999 | Schmelzer | B01D 46/0004 451/451 |
| 6,089,956 A * | 7/2000 | Bohler | B24C 7/0046 451/38 |
| 6,364,748 B1 * | 4/2002 | Zwicker | B24C 9/00 451/38 |
| 7,249,994 B2 * | 7/2007 | Sommacal | B24C 1/003 451/88 |
| 7,695,348 B2 * | 4/2010 | Mase | B24C 9/00 451/87 |
| 2007/0001342 A1 | 1/2007 | Oberhofer et al. | |
| 2012/0052145 A1 | 3/2012 | Chen et al. | |

FOREIGN PATENT DOCUMENTS

| | | |
|---|---|---|
| GB | 2526341 A | 11/2015 |
| JP | 1991090683 U | 9/1991 |
| JP | H0614858 Y2 * | 4/1994 |
| JP | 1997168993 A | 6/1997 |
| JP | 2003506229 A | 2/2003 |
| JP | 2003173978 A | 6/2003 |
| JP | 2005164813 A | 6/2005 |
| WO | 2008142691 A2 | 11/2008 |
| WO | 2011085735 A1 | 7/2011 |
| WO | 2015177195 A1 | 11/2015 |

OTHER PUBLICATIONS

Search Report; dated Oct. 30, 2014; pp. 6.
International Search Report and Written Opinion for PCT/EP2015/061083 dated Nov. 8, 2015, 11 pages.
U.S. Department of Health and Human Services, "Biosafety in Microbiological and Biomedical Laboratories", 5th Edition (Dec. 2009), Appendix A (p. 312), 438 pages in total.
Islam et la., "An Investigation of Dimensional Accuracy of Parts Produced by Three-Dimensional Printing", Proceedings of the World Congress on Engineering 2013, vol. I WCE 2013, Jul. 3-5, 2013, 4 pages, London, U.K.
Office Action dated Apr. 2, 2019 for co-pending Japanese Patent Application No. 2017-513334; 7 pages; English translation 7 pages.
Office Action dated Apr. 30, 2019 for co-pending Taiwanese Patent Application No. 104116167; 8 pages; English translation 4 pages.

* cited by examiner

FLOW CABINET SYSTEM FOR CLEANING AT LEAST ONE OBJECT

PRIORITY CLAIMS

This invention claims priority to PCT Application Serial No. PCT/EP2015/061083 filed May 20, 2015, which claims priority to Great British Application Ser. No. 1409112.8 filed May 21, 2014. The contents of which are hereby incorporated by reference.

TECHNICAL FIELD

The invention relates to a flow cabinet system for cleaning at least one object, and to the use of such a flow cabinet system for cleaning green parts made by a three-dimensional printing process.

BACKGROUND

The objects made by the additive manufacturing technique referred to as three-dimensional printing, or 3D printing, are also referred to as parts. The parts are typically made by spreading successive layers of powder, here specifically metal powder, in a powder bed, and by releasing a binder into each powder layer. The binder binds regions within each layer to each other and to regions in the layer beneath it. Once all the necessary layers have been spread and bound, one or more three-dimensional parts have been produced. These parts are referred to as "green" parts. They still contain the binder. The parts need to be cleaned so as to remove the excess, non-bound powder, before they can be de-binded, for instance by controlled heating, and post-processed, for instance by sintering or other types of curing.

The green parts are relatively fragile. Moreover, they currently have a dimensional accuracy of several tens of micrometers. For a discussion of dimensional accuracy see "An Investigation of Dimensional Accuracy of Parts Produced by Three-Dimensional Printing" by M. N. Islam et al. in Proceedings of the World Congress on Engineering 2013 Vol. I, WCE 2013, Jul. 3-5, 2013, London, U. K. The dimensional accuracy is expected to improve. The surface roughness of the green parts is in the range from several to several tens of micrometers. It is largely determined by the grain size and the physical properties of the metal powder and by the printer resolution. Efforts are made to lower the surface roughness and consequently improve the surface quality of the post-processed parts. It should be evident that any accidental removal of bound powder from the green parts will significantly influence the dimensional accuracy and the surface quality of the parts. This is to be avoided. The invention addresses this need and provides a system for non-destructively cleaning such green parts.

When designing such a system, however, the health and safety of the operator using the cleaning system is also to be considered because powders, here specifically metal powders, pose health and safety hazards. The main hazards have been split into two, explosion within a process and personal health hazards. For both types of hazards see Chapter 15 of "Fundamentals of Particle Technology" by Richard G. Holdich, Midland Information Technology and Publishing, Shepshed, Leicestershire, U. K, 2002. A short summary is as follows. Very fine metal powders as used in 3D printing become airborne. Many of these, e.g. magnesium and aluminum, have been found to be explosive provided that certain conditions are met, amongst them a critical dust concentration, a certain temperature and an ignition source of sufficient energy. The present invention seeks to avoid meeting these conditions. Powders having an average particle diameter of 10 µm or less can also be absorbed into the body and give rise to chemical or biochemical reactions that are potentially dangerous for the skin, the eyes and the lungs. The present invention seeks to reduce the exposure of the operator to the metal powder removed in the cleaning process.

The invention thus proposes a flow cabinet system for cleaning objects such as green parts made by a three-dimensional printing process. Flow cabinets are generally known. However, the inventors found that none of the known systems addressed the specific needs described above.

For instance, Biosafety in Microbiological and Biomedical Laboratories (BMBL), 5th Edition (December 2009) discloses in Appendix A various types of biological safety cabinets designed to provide personal, environmental and product protection. A horizontal laminar flow cabinet and a vertical laminar flow cabinet are disclosed in Appendix A; however, whilst these cabinets may sufficiently protect the product, they protect the operator only insufficiently.

U.S. Pat. Nos. 3,599,375, and 4,300,318 show examples of a cabinet system comprising a cabinet and a handheld gun. By means of the gun an operator is able to direct abrasive material to an object to be abraded inside the cabinet. If abrasion can be considered "cleaning" at all, it has to be considered a destructive cleaning since the abrasion removes part of the material to be cleaned. The cabinet system of U.S. Pat. No. 4,300,318, for instance, generates relatively large amounts of powder, dust, debris, abrasive material and particles dislodged from the object, such that the cabinet system uses a vacuum motor and additionally requires a rack and a hopper connected to the vacuum motor to remove these amounts from the cabinet.

Therefore, it is the goal of the present invention to provide a flow cabinet system optimized to clean objects in an efficient and operator protective manner, in particular objects manufactured with additive manufacturing.

SUMMARY

This goal is achieved by a flow cabinet system according to claim 1.

In the flow cabinet system the cabinet walls enclose a volume which receives the object or objects to be cleaned. Compressed gas is supplied to the volume so as to effect the removal of powder from the object or objects. An extraction unit extracts powder-laden gas from the volume. So as to enable the extracted volume to exceed the supplied volume, the cabinet comprises a gas inlet. The location of the gas outlet of the volume with respect to the location of the gas inlet in the back wall provides a flow inside the volume which is directed from one to another of the side walls of the cabinet. Thus, gas enters the volume of the cabinet at one side, flows past the object, takes up and carries the powder to be removed from the object, and powder-laden gas leaves the volume of the cabinet at the other side, with no or only a minimal component of the flow being directed to the operator. The gas outlet is accordingly near one of the left and right side walls and the back wall and the gas inlet in the back wall near the other of the left and right side walls and the back wall. In this context, "near" is to be understood as being closer to the end of the wall than to the middle of the wall. Thus, the powder-removing flow inside the volume of the cabinet between the side walls of the cabinet is mainly horizontal. Further, the extraction unit is constructed and arranged to extract a minimum volume of powder-laden gas per unit of time, this minimum volume being larger than the maximum volume of the supplied compressed gas per the unit of time. By means of such an extraction capacity and the locations of the gas outlet and the gas inlet, it can be prevented that the powder laden gas flow is directed to the operator cleaning the object by means of the supplied compressed gas. Further, the direction of the flow between the side walls optimizes the cleaning process and increases the capacity of powder to be removed from the cabinet per unit of time. The gas inlet can be provided with a filter for filtering the gas entering the volume, such that the cabinet is also designed to provide product protection.

The extraction unit is advantageously constructed and arranged to extract a minimum volume of powder-laden gas per unit of time which is at least twenty times the maximum volume of the supplied compressed gas per the unit of time. This difference in volumes was found to ensure that the extracted volume is sufficiently high so as to generate suction at the glove ports and all other interfaces of the volume.

The extraction unit may further comprise at least one silencer, wherein the silencer is an internal silencer positioned inside the cabinet and/or an external silencer positioned outside the cabinet. The silencer reduces the noise produced by the extraction unit such that the cabinet system provides an operator-friendly working environment. The external silencer is preferably positioned adjacent the bottom wall of the cabinet so as to reduce the total amount of tubing required.

If the gas outlet coincides with an inlet of the external silencer, and an outlet of the external silencer is in the form of a tubing connector, external tubing to be connected to the volume so as to conduct the extracted powder-laden gas away from the volume can be connected directly to the silencer.

The removal of the powder laden gasses can be optimized for certain cleaning operations by switching between the internal silencer and external silencer. So as to minimize the effort required for the switching, the walls of the cabinet comprise four tubing connectors, each permitting the connection of tubing inside and outside of the cabinet. The tubing connectors thus provide an opportunity for an operator to switch from the external silencer to an internal one from within the cabinet, by changing a tubing connection within the volume. There is thus no need for the operator to change his working position.

In accordance with another advantageous feature of the invention, each of the glove ports has a glove connected thereto in a gas-impermeable manner, wherein each glove is made of a gas-permeable material. Preferably, the gas-permeable material is Gore-Tex. Gore-Tex is fabric membrane, and a registered trademark of W. L. Gore and Associates. The material of the glove is impermeable for powder coming from the objects to be cleaned such that the skin of an operator is protected but is permeable for gas. In conjunction with the extraction volume of powder-laden gas per unit of time being larger than the maximum volume of the supplied compressed gas per the unit of time, this creates an automatic cleaning effect for the gloves and further reduces the exposure of the operator to powder because the difference in volumes seeks to suck possible powder material away from the gloves.

Electrostatic discharges within the volume may ignite a critical mixture of airborne powder and air within the volume. So as to prevent the ignition, all the tubing within the volume is anti-static. Moreover, if all the electrically conductive components of the cabinet system are on the same electric potential and the cabinet system is grounded, the build-up of potential differences which may result in electrostatic discharges can be prevented.

The handheld cleaning tools are constructed and arranged to use compressed gas. The use of compressed gas is to be understood in that the compressed gas is without blasting material; the handheld cleaning tools may, for instance, use compressed air. The absence of blasting material from the compressed gas prevents any damage to the objects to be cleaned. Each of the plurality of cleaning tools within the volume is connected to a valve terminal permitting the operator to select one of the cleaning tools connected thereto from within the volume. The valve terminal is preferably positioned near the top wall of the cabinet. This contributes to the tubing being outside the working area and neither obstructing the flow between the side walls nor impinging upon the object supported by the bottom wall. Possible excess tubing length may be temporarily held by a plurality of hooks, which the invention preferably provides near or on the top wall. This also contributes to the working area to be clear of tubing.

The extraction unit can comprise a cyclone separator. The cyclone separation technique has proven to be particularly effective in achieving a separation of metal powder and gas, whilst not becoming clogged by powder particles. The operating life of the cyclone separator is much superior to many other separation techniques.

As it may be desired to recycle the powder that is removed from the green parts, the extraction unit can further comprise a removable container for collecting the powder particles that were separated from the gas by the cyclone separator. The container can be emptied by the operator. When considering the arrangement of elements of the extraction unit relative to the stream of powder-laden gas, the removable container is thus downstream of the cyclone separator which is, in turn, downstream of the silencer. At the cyclone separator, the stream of powder-laden gas is separated into a stream of predominantly powder, which is collected in the container, and a stream of predominantly gas. So as to remove remaining powder content from the latter stream, the extraction unit can advantageously be provided with a filter for filtering the gas discharged to the atmosphere.

Whilst the inventive flow cabinet system can be used for several types of operations, it is a particular and independent aspect of the present invention that it be used for the cleaning of objects that are green parts made by a three-dimensional printing process, and preferably metal green parts made by a three-dimensional printing process. This use is where the design features of the inventive flow cabinet system are particularly advantageous.

BRIEF DESCRIPTION OF THE DRAWINGS

FIG. 1 shows an isometric view onto the left of a cabinet for a flow cabinet system for cleaning objects; hereinafter be described with reference to the accompanying drawings, wherein:

DETAILED DESCRIPTION OF THE EMBODIMENTS

Figure 1:
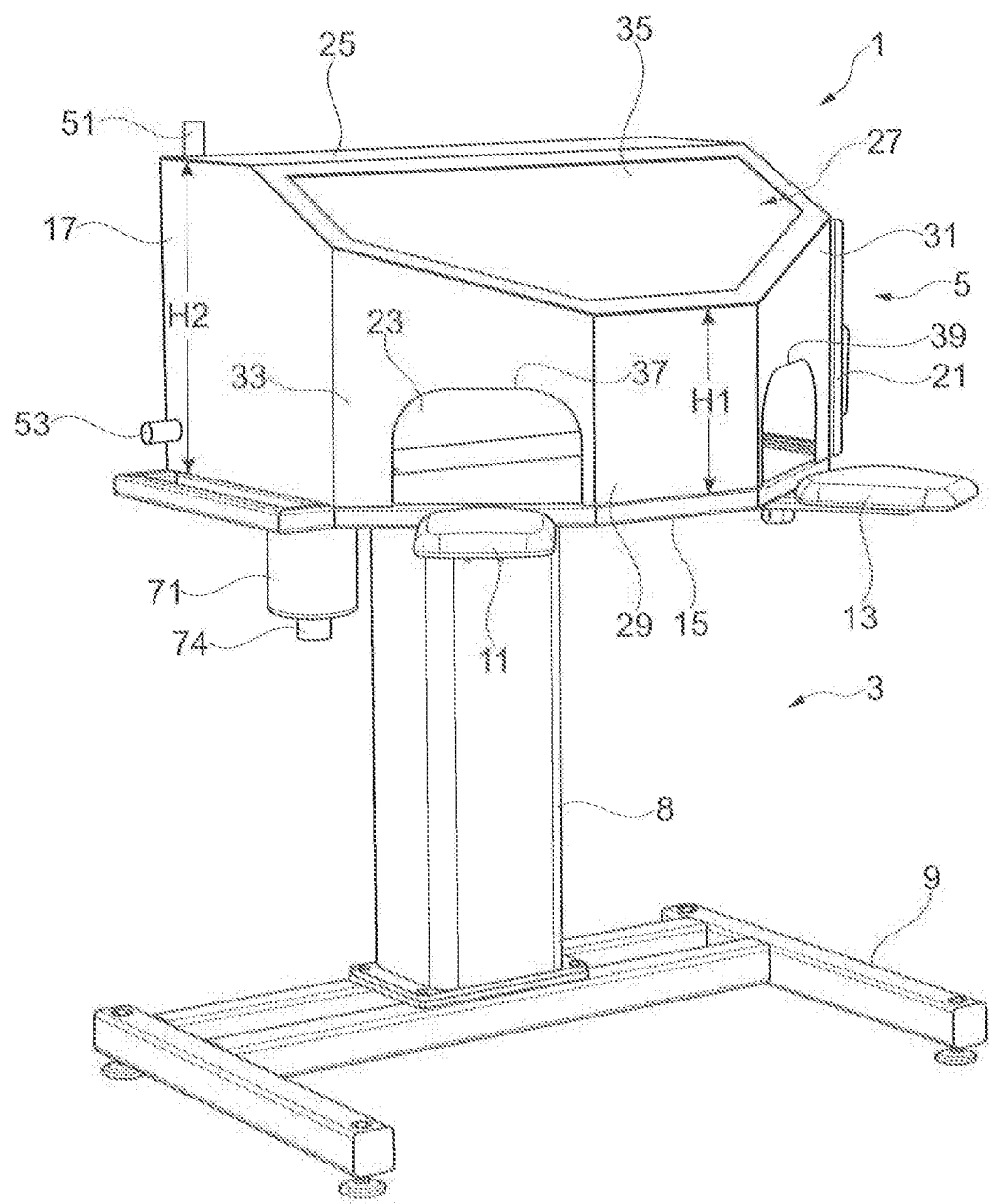

In the following description of a preferred embodiment of the invention, identical or corresponding parts have identical or corresponding reference numerals.

Figure 2:
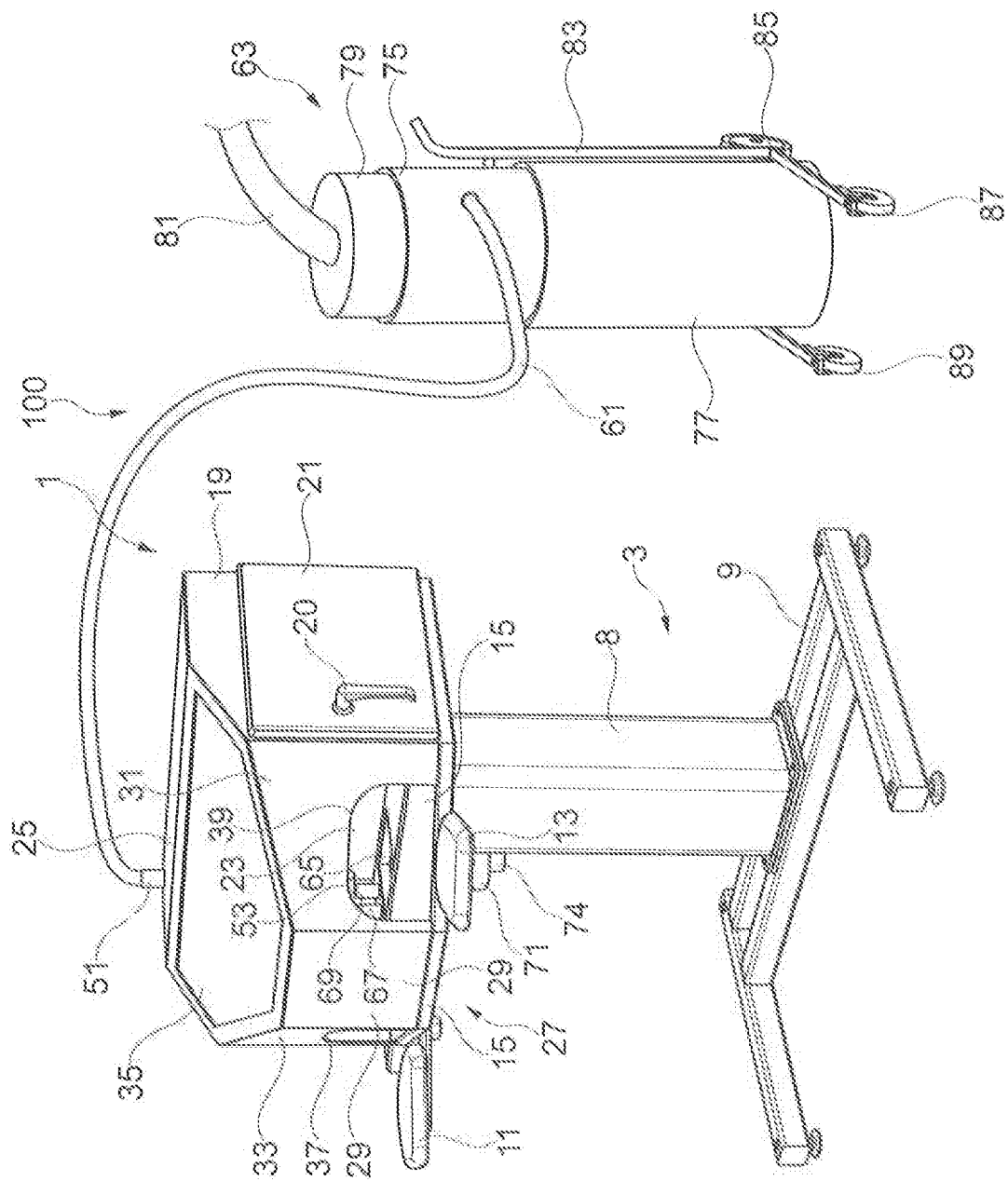
FIG. 2 shows an isometric view onto the right of the flow cabinet system for cleaning objects and also illustrates the cyclone separator and the removable container of the extraction unit.

FIGS. 1 and 2 show a flow cabinet 1 supported by means of a base 3, the base comprising a post 8 and a base support 9. More preferably, the cabinet base 3 comprises a vertically extending post 8 which is bolted to a horizontally extending base support 9. The post 8 and/or the base is/are preferably grounded, for example by means of an electrode or a wire (not shown) in contact with the earth. The flow cabinet 1 comprises a cabinet housing 5 defining the volume of the flow cabinet 1.

The cabinet housing 5 comprises a horizontally extending bottom wall 15, a vertically extending left side wall 17, a vertically extending right side wall 19 comprising a sealed and articulated door 21 providing access to the interior volume of the cabinet housing 5, a vertically extending back wall 23, a horizontally extending top wall 25 and a front wall 27. The door 21 is attached to the remainder of the cabinet housing 5 in an electrically conductive fashion. An attachment by means of bolts supplemented with corrugated spring washers, or ground wires bridging the articulation, or other means known to the skilled person are envisaged.

The horizontal outer dimension of the cabinet housing 5 is preferably about 10 to 50% larger than the average shoulder width of an adult male. The horizontal dimensions of the base support 9 correspond to or are larger than the horizontal dimensions of the cabinet housing 5.

The operator-facing front wall 27 comprises four wall components, i.e. a vertically extending center wall component 29, a vertically extending right side wall component 31, a vertically extending left side wall component 33 and a viewing window wall component 35. The viewing window wall component 35 comprises a viewing window. The viewing window wall component 35 extends between the center wall component 29, the side wall components 31, 33, the side walls 17, 19 and the top wall 25. The center wall component 29 extends between the side wall components 31, 33 and between the bottom wall 15 and the viewing window wall component 29. The maximal vertical height H1 of the center wall component 29 is smaller than the vertical height H2 of the back wall 23 where the top wall 25 is located. Therefore, the viewing window wall component 29 is inclined from the top wall 25 towards the center wall component 29. This provides an optimal view for an operator to look through the viewing window inside the cabinet housing 5. Further, each side wall component 31, 33 comprises a port 37, 39 forming an opening for an operator's hand and arm and having a flange or comparable means for the attachment or connection of gloves. The flow cabinet 1 further comprises armrests 11, 13 which are connected, preferably adjustably connected, in front of the ports 37, 39 in the side wall components 31, 33. With the exception of the viewing window, the cabinet housing 5 is preferably made of an electrically conductive material, more preferably metal, and still more preferably stainless steel.

FIG. 2 shows a cabinet system 100 for cleaning an object. The cabinet system 100 comprises the flow cabinet 1 shown in FIG. 1 and an extraction unit 63. The extraction unit 63 is external, i.e. it has a housing that is separate from the flow cabinet 1 and its base 3. It is constructed and arranged to extract between 50 Nm3/hour and 250 Nm3/hour, preferably between 100 Nm3/hour and 200 Nm3/hour, of powder-laden gas per unit of time from the volume of the flow cabinet 1. In the present text, "Nm3/hour" refers to a flow rate expressed in normalized cubic meters per hour as per the standard conditions for temperature and pressure of ISO 5011.

The extraction unit 65 comprises a cyclone separator 75, a removable container 77 for collecting the powder particles which were separated from the gas by means of the cyclone separator 75 and a filter device 79 for filtering the gas discharged from the cyclone separator to the atmosphere. The extraction unit 65 may be based on a Nederman Fb216, but modified so as to reverse the stacking of cyclone separator and filter device 79 on top of each other. It comprises an inlet provided with a tubing connector (not shown). The filter device 79 uses a filter discharge hose 81 to discharge the filtered gas, such that the cabinet system 100 provides environmental protection. The extraction unit 63 is arranged on a mobile unit 83 provided with four wheels 85, 87, 89. The cyclone separator 75 may be based on a Nederman silo system 50, Nederman part number 43424001 in 2014.

The flow cabinet 1 comprises a first tubing connector 51 in the top wall 25, a second tubing connector 53 in the left side wall 17 (both can be taken from FIG. 1), and a third and fourth tubing connectors 67, 69 (FIG. 2) in the bottom wall 15, wherein the third and fourth tubing connectors 67, 69 are located next to each other. The tubing connectors 51, 53, 67, 69 extend through the walls so that they permit the connection of a tube on the inside and the outside of the cabinet volume whilst maintaining an undisturbed fluid communication therebetween. Each of the tubing connectors 51, 53, 67, 69 can be used in one embodiment of the invention to connect to the gas outlet of the volume of the cabinet as will be explained below.

The bottom wall 15 further comprises a through hole 65 (FIG. 2), an external silencer 71 being connected to in a gas tight manner the outside of the bottom wall so that the through hole permits fluid communication with the inlet of the silencer. The silencer can be a Nederman CWN-S_105_40. The through hole 65 as the gas outlet of the volume is preferably essentially coextensive with an inlet 76 of the external silencer 71. In accordance with the invention, the gas outlet in one of the walls of the cabinet, is not located in the front wall.

In the preferred embodiment, the outlet of the external silencer 71 is in the form of a tubing connector 74 to which the extraction unit 63 can be connected. More preferably, the tubing connector 74 of the outside silencer 71 lies opposite the inlet 76.

In the cabinet system 100 the cyclone separator 75 is connected by a tube 61 with the first tubing connector 51 of the flow cabinet 1. On the inside of the volume, a piece of tubing (not shown) is connected at one end to the tubing connector 51. Its other end can be connected to either of the tubing connectors on the inside.

Figure 3:
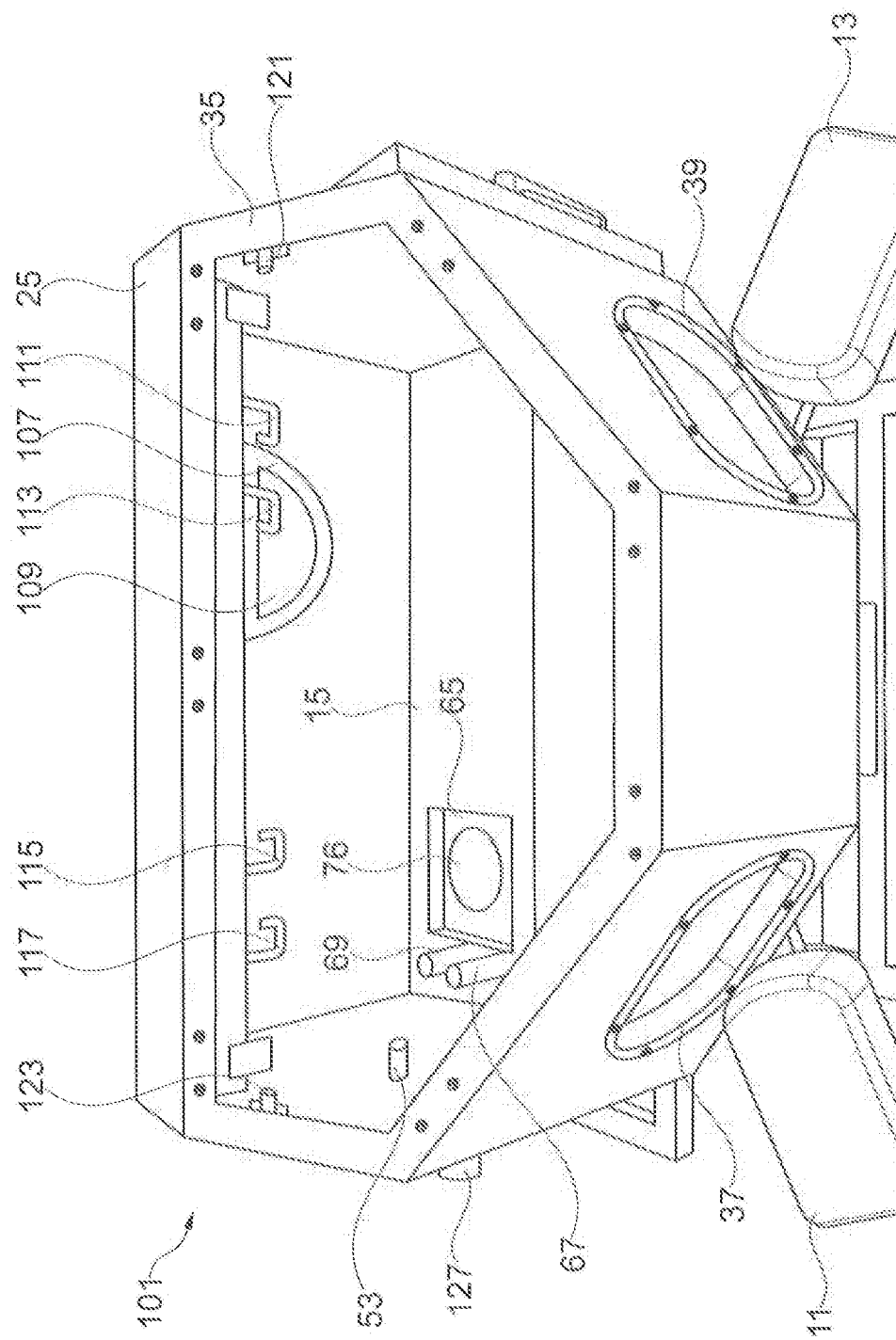
FIG. 3 shows an isometric top view onto the cabinet of the flow cabinet system.
Figure 4:
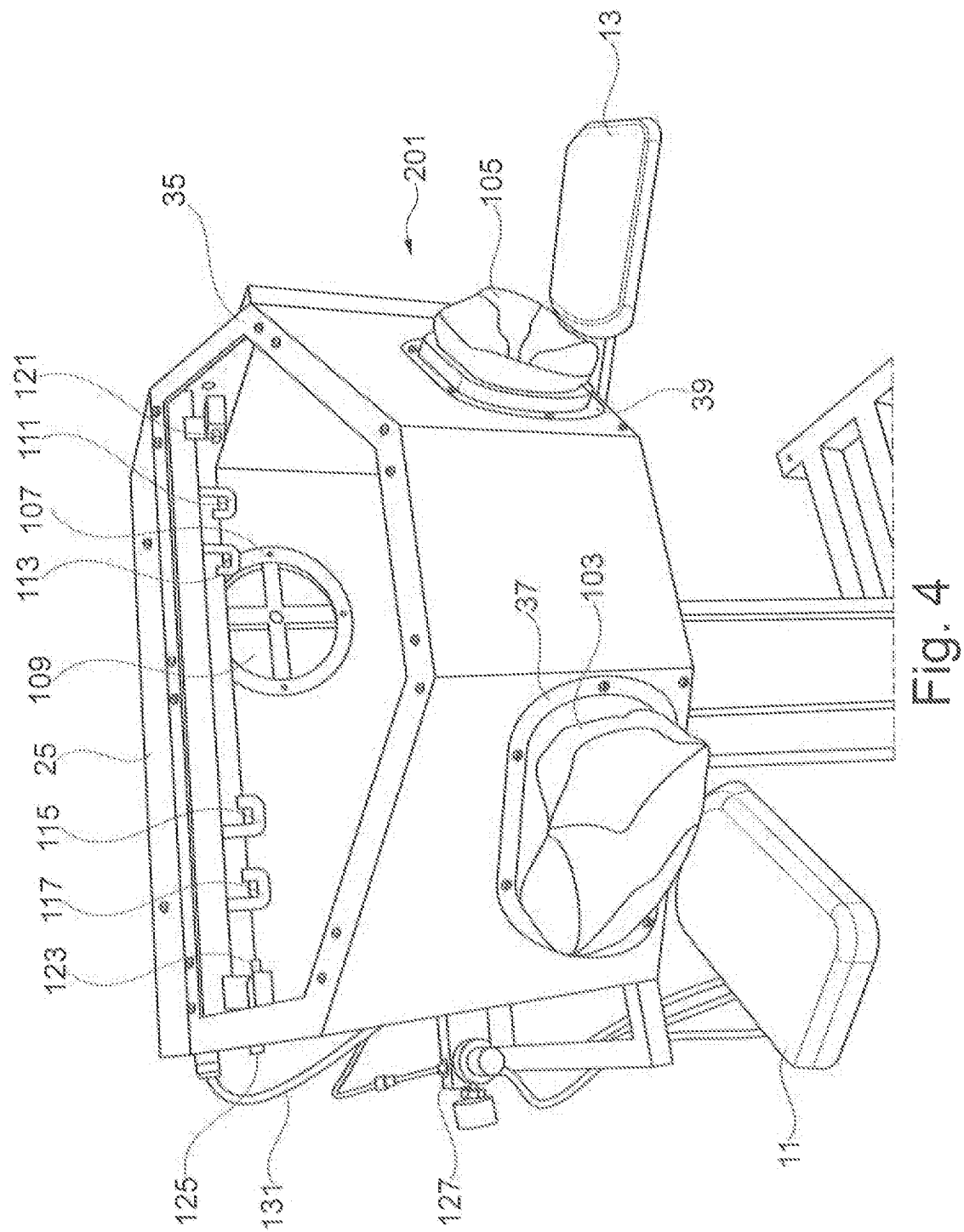
FIG. 4 shows the cabinet shown in FIG. 3 provided with gloves.

FIGS. 3 and 4 show cabinets 101, 201 which are identical in construction. However, the flow cabinet 101 shown in FIG. 3 differs from the cabinet 201 shown in FIG. 4 in that the cabinet 201 is provided with gloves 103, 105 that are attached or connected to the glove ports 37, 39.

The gloves 103, 105 are attached, or connected, in a gas-impermeable manner. In the embodiment shown, the attachment or connection has been effected by means of hose clamps which have been tightened around the gloves and the flanges on the ports 37, 39. Naturally, other means are possible and will be apparent to the skilled reader. The gloves 103, 105 are made of a material impermeable for powder particles and permeable for gas. One such material may be a Gore-Tex material. The pore size of the Gore-Tex material will be suitably determined so that, in normal operation of the cabinet system, the difference in volume per unit of time between the extracted powder-laden gas and the supplied gas is sufficient to prevent powder particles from sticking to the gloves. Advantageously, this provides a self-cleaning effect and contributes to operator safety.

Further, the FIGS. 3 and 4 show details of the flow cabinet 1 not shown in FIGS. 1 and 2. As can be seen in FIGS. 3 and 4 the back wall 23 comprising a gas inlet 107 is provided with a filter 109.

Further, an inside of the top wall 25 of the cabinets 101; 201 is provided with four hooks 111, 113, 115, 117 for supporting cleaning tool tubing 601, 602 (FIG. 6) for the supply of compressed gas to a plurality of handheld cleaning tools 603 (FIG. 6 rectangular boxes labeled with the letter "T") within the volume. Each cleaning tool is connected to a valve terminal 121, 123, permitting an operator to select one of the cleaning tools connected thereto. The valve terminal is preferably positioned near the top wall 25. The valve terminal 123 can be connected on the outside 125 of the cabinet housing with a pressurized gas source (not shown). As illustrated, the valve terminal can be mounted to the top wall 25 or to the upper parts of the back wall or the side walls. "Near" the top wall 25 should be understood as being closer to the top than to the bottom wall. As an alternative to the plurality of valve terminals shown at 121, 123, a single valve manifold 124 can also be provided (see FIG. 5).

The flow cabinet 101; 201 is provided with a control unit 127 on the outside of the side wall 17. The control unit 127 can be operated to control the supply pressure from a pressurized gas source (not shown) to the handheld cleaning tools. Preferably, the outgoing compressed gas pressure of the cleaning tools for cleaning an object can be varied between 2-4 bar gauge, wherein the pressure is preferably at about 3 bar gauge, "bar gauge" indicating that the stated values are the pressure difference to ambient pressure. The volumetric flow rate of the compressed gas is within the range from 2.0 to 5.5 Nm3/hour, preferably less than 5 Nm3/hour. The side wall 17 is also provided with a switch which is connected via a cable 131 to a light unit (not shown) mounted on the top wall 25 inside the flow cabinet 101, 201.

Figure 5:
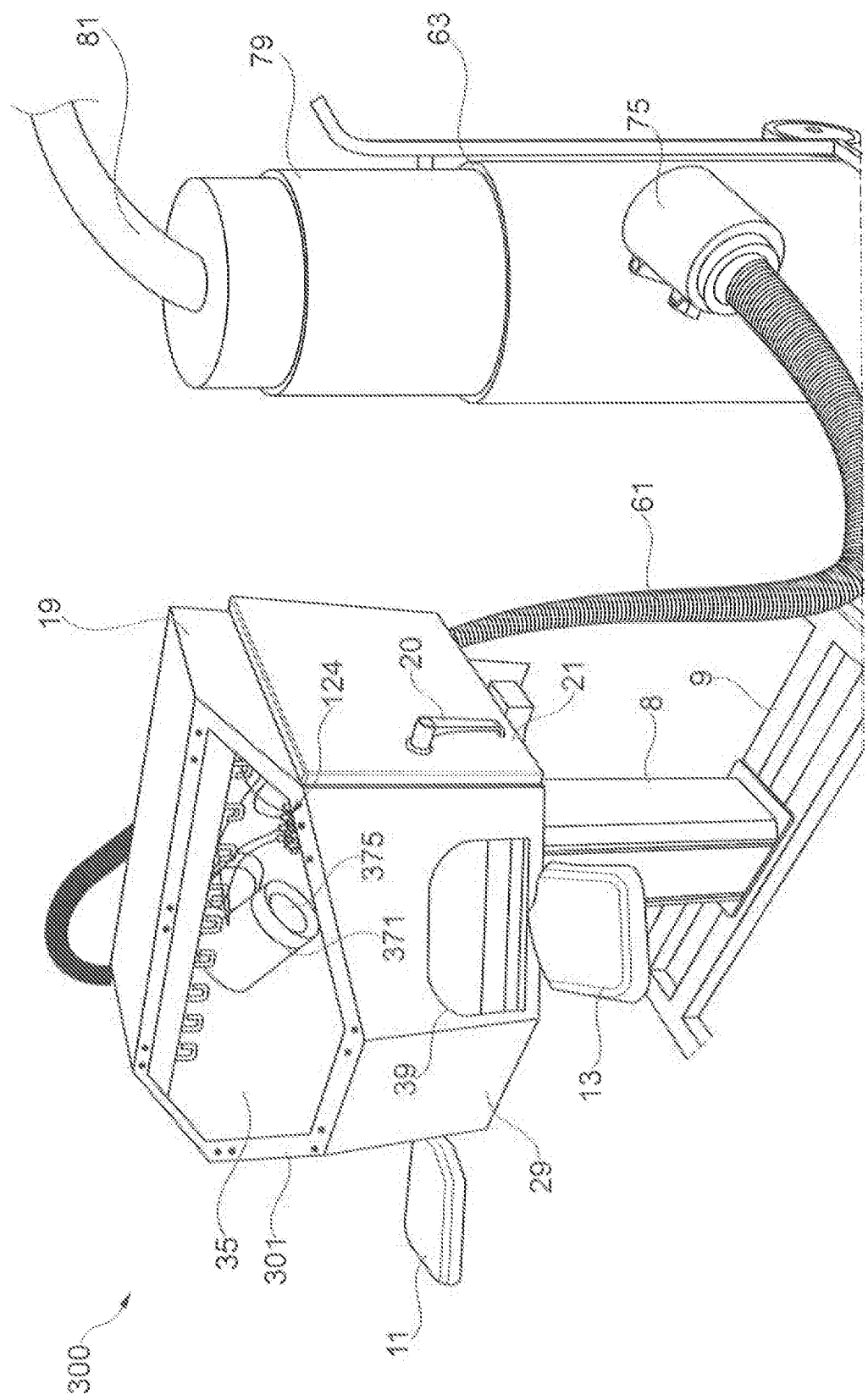
FIG. 5 shows an alternative configuration of the flow cabinet system.
Figure 6:
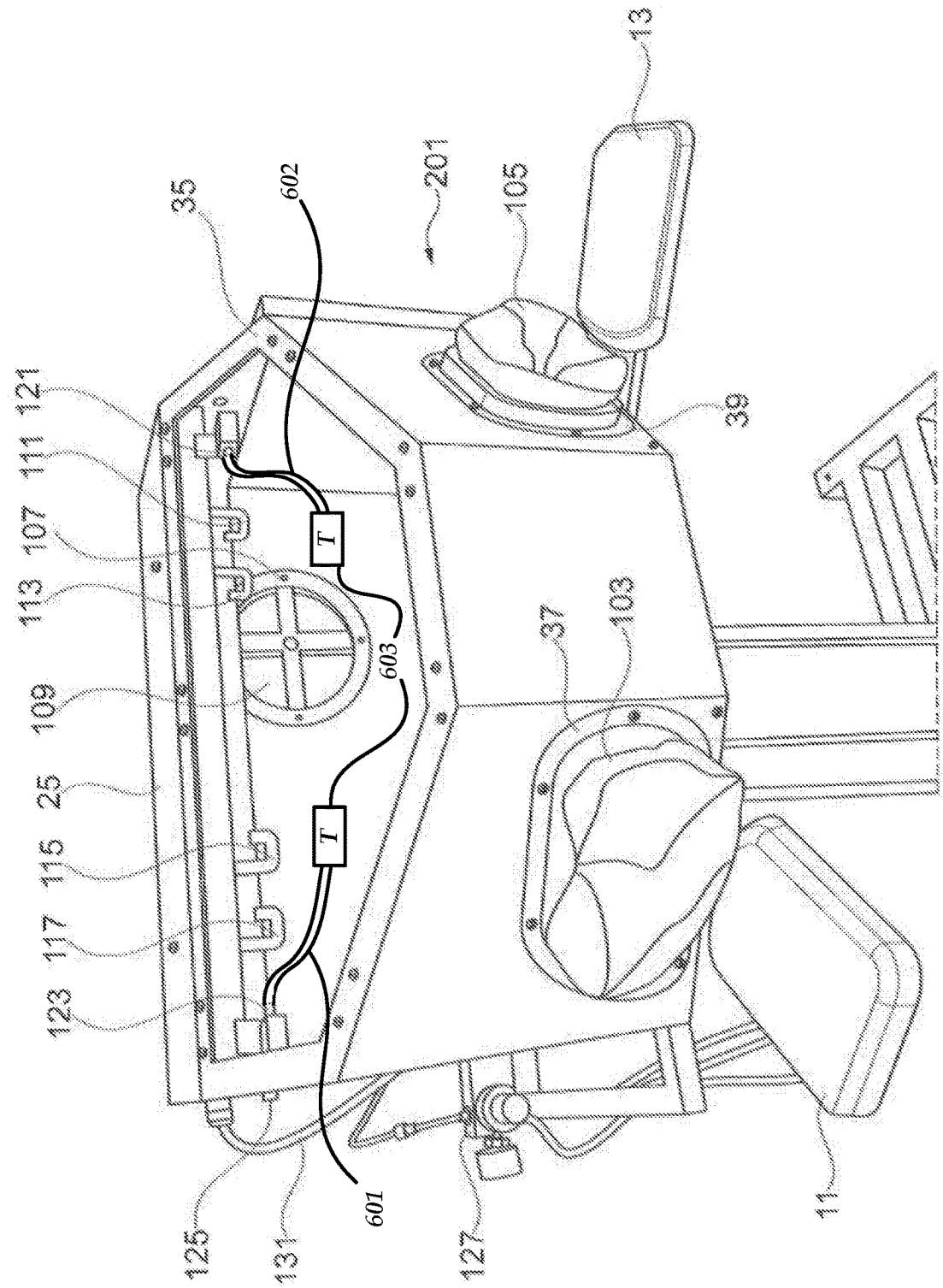
FIG. 6 shows the cabinet shown in FIG. 4 provided with a plurality of handheld cleaning tools and tubing.

FIG. 5 also shows a cabinet system 300 for cleaning objects. The cabinet 301 differs from the flow cabinets 1, 101; 201 in that an internal silencer 371 is positioned inside the volume of the cabinet 301. Here, which is preferred but not necessary, the cabinet 301 is also provided with the external silencer 71 (not shown in FIG. 5). The internal silencer 371 is provided with an inlet 375.

The cabinet systems 100; 300 and the cabinets 1; 101; 201; 301 can be used by an operator as follows: After an object or several objects have been manufactured by means of Three-Dimensional Printing, these object(s) have to be removed from the powder bed and be freed of excess powder. This cleaning process is a delicate operation since green parts have a comparably low strength and are inherently fragile. Damage of the green parts is to be avoided. Cleaning is effected by using the cabinet system 100; 300.

The operator opens the door 21 of the flow cabinet 1; 101; 201; 301 by means of the door handle 20 to position the object(s) on the bottom wall 15 in the volume of the cabinet. The bottom wall is able to support an object and to collect matter removed from the object like dust and powder if necessary. The bottom wall 15 of the cabinet defines a closed bottom boundary of this volume. In other words, the matter to be removed from the object does not pass the bottom wall to an internal volume of the cabinet below the bottom wall. In this manner, the cabinet has a relatively compact volume. By means of the extraction unit and the compact volume of the cabinet it is possible to remove powder-laden gasses from the cabinet in an efficient manner without any additional tools such as for example a hopper.

Before starting the cleaning process by means of the handheld cleaning tools the extraction unit 63 is preferably activated. In use the extraction unit 63 sucks gasses and powder laden gasses from the volume of the cabinet housing 5. The extraction unit 63 is constructed and arranged to extract a minimum volume of powder-laden gas per unit of time which is larger, preferably at least twenty times larger, than the maximum volume of the supplied compressed gas per the unit of time. The silencers 71, 371 reduce the noise produced by the extraction unit 63 in use such that the cabinet system 100 provides a more operator friendly working environment.

In one embodiment, the cabinet system can be operated without an internal silencer 371. In this case the extraction unit 63 can be connected directly to the external silencer 71 by connecting the tubing connector of the cyclone separator 75 via the tube 61 with the tubing connector 74 of the external silencer 71. The gas outlet of the volume of the cabinet then coincides with the inlet 76 of the external silencer 71.

In another embodiment, the cabinet system can be operated without an external silencer 71. In this case, the extraction unit 63 can be connected to the internal silencer 371 by connecting the tubing connector of the cyclone separator 75 via the tube 61 with either of the tubing connectors 51, 53, 67 or 69 of the cabinet, the inside part of these connectors then being connected by a piece of tubing to the internal silencer 371 (as shown in FIG. 5).

In yet another embodiment, the cabinet system can be operated with both, the internal silencer 371 and the external silencer 71 being present, by selecting one of them and being able to change "on the fly", i.e. during the operation and from within the volume. In this case, the extraction unit 63 can be connected to either the internal silencer 371 or the external silencer 71 by means of a piece of tubing within the volume. The cyclone separator 75 may for instance be connected by means of the tube 61 to any one of the tubing connectors, as an example to the first tubing connector 51 of the flow cabinet 1. Inside the cabinet, a piece of tubing is then connected to the first tubing connector 51. Further inside the cabinet, one of the remaining connectors 53, 67 or 69 is connected by another piece of tubing to the internal silencer 371, as shown in FIG. 5, say tubing connector 53. This leaves the other two tubing connectors free, in the example tubing connectors 67 and 69. If one of these, say tubing connector 67, is connected on the outside of the cabinet to the outside of tubing connector 53, it will establish a flow connection to internal silencer 371. If the other of the two, say tubing connector 69, is connected on the outside of the cabinet at tubing connector 74 to the external silencer 71, a flow connection will be established there as well. The operator can now simply switch between using either of the internal or external silencers by taking the piece of tubing connected to the internal part of connector 51 and connecting it to either of the tubing connectors 67 (and use the internal silencer) or 69 (and use the external silencer). If necessary, the tubing connector 67, 69 not selected can be capped with a capping member.

During a cleaning process of an object or for a new cleaning process requiring different circumstances the operator is thus able to switch from the external silencer 71 to the internal silencer 371 and vice versa, without having to take his hands out of the gloves which are typically used to manipulate the handheld cleaning tools and to hold the objects to be cleaned.

Manipulation of the handheld cleaning tools directs compressed gas to the surface of the object to be cleaned. The operator can inspect the cleaning process through the viewing window of the viewing wall component 29. The pressure of the compressed gas supplied to the cleaning tool can be adjusted by means of the control unit 127 and by means of the valve manifold inside the cabinet the operator is permitted to select the desired cleaning tool to be used, for instance a brush, a nozzle, a syringe needle or the like. It would of course also be possible that the cleaning tool has an end which can be interchangeably coupled with such tools. After the cleaning process the clean objects can be removed from the cabinet by means of the door 21.

To prevent dust explosions all the tubing used within the cabinet is anti-static. In the interest of standardization and a reduction of operator-based errors, all the tubing can be of the same type and size so that all would be anti-static. Sources for such tubing will be known to the skilled person.

The prevention of dust explosions is further assisted if the extraction unit 63 is grounded and if the metal components of the flow cabinet 1; 101; 201; 301 are electrically conductive and connected to each other in an electrically conductive manner. This can be achieved with fasteners like screws or bolts to grounded metal of the cabinet base 3 supporting the flow cabinet 1; 101; 201; 301. The bottom wall 15 is equally made of electrically conductive material or has an electrically conductive coating to prevent sticking of the green parts to the bottom surface and to prevent the buildup of electrostatic charges. The currently most preferred embodiment has all the walls made of stainless steel.

The hooks 111, 113, 115, 117 and the connectors for the cleaning tool are positioned near the top wall such that in use of the cabinet system the hoses are kept from the working area and minimally obstruct the operator's view through the viewing window of the viewing wall component 29.

As illustrated, the number of hooks may vary, exemplary embodiments with two sets of two hooks 111, 113, 115, 117 (FIGS. 3 and 4) and ten hooks (FIG. 5) inside the flow cabinet 1, 101, 201 being illustrated.

The filters of the filter device 79 can be interchanged in a user-friendly and relatively efficient way. Preferably, the filter(s) of the filter device 79 is the same filter as used in the air inlet 107 of the cabinet, such that the number of different interchangeable components of the cabinet system is minimal.

Instead of the extraction unit 63 of the cabinet systems 100; 300 shown in the figures, it is also possible to use a stationary extraction unit (not shown). In addition, it is possible to mount such a stationary extraction unit to the flow cabinet 1 or the cabinet base 3. For example, the stationary extraction unit can be fixed to the post 8 (FIG. 1) between the bottom plate 15 and the base support 9. Such an extraction unit may also comprise a cyclone separator, a container and a filter, but is also possible to use an extraction unit with a different configuration.

By arranging an extraction unit on a mobile unit the interchangeability of the extraction unit can be increased, such that for example during maintenance of a first extraction unit it is possible to connect the cabinet with a second extraction unit such that it remains possible for the operator to work with the same cabinet. It is also possible to use an extraction unit without a silencer.

The invention claimed is:

1. A flow cabinet system for non-destructive cleaning of at least one object, the system comprising:
   a cabinet having a bottom wall for supporting the at least one object to be cleaned, a top wall, a left side wall, a right side wall, a front wall and a back wall, the walls enclosing a volume;
   a valve terminal within the volume for supplying, via tubing, compressed gas without blasting material to a plurality of handheld cleaning tools and tubing within the volume for removing, by means of the supplied compressed gas, powder from the at least one object; and
   an extraction unit comprising tubing for extracting powder-laden gas from the volume through a gas outlet located near the back wall and one of the left and right side walls;
   the cabinet further comprising a gas inlet to the volume in the back wall near the other of the left and right side walls to provide a horizontal gas flow from the gas inlet to the gas outlet, a viewing window, a left glove port near the left side wall and the front wall and a right glove port near the right side wall and the front wall, the two glove ports being constructed and arranged for an operator to manually operate at least one of the plurality of cleaning tools inside the cabinet, the gas inlet extending through the back wall;
   the extraction unit being constructed and arranged to extract a minimum volume of powder-laden gas per unit of time larger than the maximum volume of the supplied compressed gas per the unit of time.

2. The flow cabinet system according to claim 1, wherein the extraction unit is constructed and arranged to extract a minimum volume of powder-laden gas per unit of time which is at least twenty times the maximum volume of the supplied compressed gas per the unit of time.

3. The flow cabinet system according to claim 1, wherein the extraction unit is constructed and arranged to extract between 50 Nm3/hour and 250 Nm3/hour, of powder-laden gas, and the combination of tubing for the supply of compressed gas with each of the plurality of handheld cleaning tools being constructed and arranged to supply compressed gas at a pressure within the range from 2 to 4 bar gauge, and at a volumetric flow rate within the range from 2.0 to 5.5 Nm3/hour.

4. The flow cabinet system according to claim 1, wherein the extraction unit comprises at least one of (a) an internal silencer positioned inside the cabinet and (b) an external silencer positioned outside the cabinet, the external silencer being positioned for it to be adjacent the bottom wall of the cabinet, and the gas outlet coinciding with the inlet of the external silencer and the outlet of the external silencer being in the form of a tubing connector.

5. The flow cabinet system according to claim 4, wherein the walls of the cabinet comprise four tubing connectors, each permitting the connection of tubing inside and outside of the cabinet.

6. The flow cabinet system according to claim 1, wherein all the tubing within the volume is anti-static.

7. The flow cabinet system according to claim 1, wherein all the electrically conductive components of the cabinet system are on the same electric potential and wherein the cabinet system is grounded.

8. The flow cabinet system according to claim 1, wherein the valve terminal is for selecting one of the cleaning tools connected thereto, the valve terminal being positioned near the top wall of the cabinet.

9. The flow cabinet system according to claim 1, further comprising a plurality of hooks near or on the top wall of the cabinet which are constructed and arranged to temporarily hold the tubing for the supply of compressed gas and the tubing of the extraction unit.

10. The flow cabinet system according to claim 1, wherein the extraction unit comprises a cyclone separator constructed and arranged to receive the powder-laden gas extracted from the volume and to separate powder particles from the gas.

11. The flow cabinet system according to claim 1, wherein the extraction unit comprises a removable container for collecting powder particles separated from the gas.

12. The flow cabinet system according to claim 1, wherein the extraction unit is provided with a filter for filtering the gas discharged to the atmosphere.

13. The flow cabinet system according to claim 1, wherein the gas inlet is provided with a filter for filtering the gas entering the volume.

14. The flow cabinet system according to claim 13, wherein the extraction unit is provided with a filter for filtering the gas discharged to the atmosphere, and wherein the filter of the extraction unit is identical to the filter of the gas inlet.

15. The flow cabinet system according claim 1, wherein each of the two glove ports has a glove connected thereto in a gas-impermeable manner, each glove being made of a gas-permeable material.

\* \* \* \* \*